United States Patent [19]
Tanaka et al.

[11] 3,864,429
[45] Feb. 4, 1975

[54] BLEND OF POLYVINYL CHLORIDE RESINS WITH MERCAPTAN-MODIFIED MBS RESINS

[75] Inventors: Takashi Tanaka; Shinichi Suzuki, both of Iwaki, Japan

[73] Assignee: Kureha Kagaku Kogyo Kabushiki Kaisha, Tokyo-to, Japan

[22] Filed: Feb. 12, 1973

[21] Appl. No.: 331,880

[30] Foreign Application Priority Data
Feb. 18, 1972 Japan.............................. 47-017061

[52] U.S. Cl........ 260/876 R, 260/23.74, 260/42.47, 260/42.49, 260/880
[51] Int. Cl.......................... C08f 15/00, C08f 19/00
[58] Field of Search......................... 260/876 R, 879

[56] References Cited
UNITED STATES PATENTS

| | | | |
|---|---|---|---|
| 3,546,323 | 12/1970 | Hwa et al............................. | 260/879 |
| 3,562,359 | 2/1971 | Gelman............................... | 260/879 |
| 3,652,483 | 3/1972 | Tanaka et al........................ | 260/879 |

*Primary Examiner*—Murray Tillman
*Assistant Examiner*—Richard B. Turer
*Attorney, Agent, or Firm*—Wenderoth, Lind & Ponack

[57] ABSTRACT

A high impact-resistant vinyl chloride polymer resin composition having an excellent weather resistance which is composed of from 3 to 30 weight parts of a modified MBS resin obtained from addition-reaction of an alkyl mercaptan containing from 2 to 20 carbon atoms with a butadiene-styrenemethyl methacrylate resin, and from 97 to 70 weight parts of a vinyl chloride resin.

3 Claims, No Drawings

BLEND OF POLYVINYL CHLORIDE RESINS WITH MERCAPTAN-MODIFIED MBS RESINS

The present invention relates to a high impact-resistant vinyl chloride polymer resin composition having an excellent weather-resistance.

Heretofore, there have been known several processes, wherein the impact resistance of a vinyl chloride resin is improved by blending thereinto a butadiene-styrene-methyl methacrylate graft-polymer resin (hereinafter referred to as "MBS resin") or a butadiene-styrene-acrylonitrile graft-polymer resin (hereinafter referred to as "ABS resin"), and these additive resins have been widely used as reinforcing resins for a vinyl chloride resin.

However, these MBS and ABS resins have as an essential disadvantage, poor weather resistance, which is inherent in the nature of their components. Because of this defect, use has been made, singly or in combination, of various stabilizers such as 2,6-ditertiary-butyl paracresol, 2,2'-methylene-bis (4-methyl-6-tertiary-butyl phenol), phenyl-$\beta$-naphthylamine, N,N'-di-$\beta$-naphthyl paraphenyl diamine, dilauryl 3,3'-thiodipropionate, dioctyl-tin-dioctyl thioglycolate, 2,2'-dihydroxy-4-methoxybenzophenone, and 2-(2'-hydroxy-5'-methylphenyl)benzotriazol, but no sufficient improvement in the weather resistance has been achieved therewith.

It is therefore an object of the present invention to provide a vinyl chloride polymer resin composition having improved weather resistance without sacrificing such unique properties of the MBS resin and the ABS resin used as the reinforcing resins, or as impact modifiers to vinyl chloride resin.

The object of the present invention has been accomplished by our extensive studies. More particularly, we have found that the weather resistance of an MBS resin can be significantly improved by adding an alkyl mercaptan represented by a general formula R–SH to the MBS resin in its emulsion state.

The present invention will be described more specifically hereinbelow together with preferred examples thereof.

The MBS resin referred to herein designates those graft polymers obtained by grafting an aromatic vinyl monomer and an ethylene-like unsaturated carboxylic acid alkyl ester monomer upon a conjugated diolefin polymer or a copolymer of a conjugated diolefin monomer in a major quantity and another mono-olefin monomer copolymerizable therewith in a minor quantity; or grafting an aromatic vinyl monomer and an ethylene-like unsaturated carboxylic acid alkyl ester monomer upon a copolymer of a conjugated diolefin monomer and an aromatic vinyl monomer; or grafting an aromatic vinyl monomer and an ethylene-like unsaturated carboxylic acid alkyl ester monomer upon a copolymer of a conjugated diolefin monomer and an ethylene-like unsaturated carboxylic acid alkyl ester monomer. Furthermore, the MBS resin includes a resin, wherein a portion of the ethylene-like unsaturated carboxylic acid alkyl ester which is one of the components in the above described respective polymers is substituted by a vinyl cyanide monomer.

1,3-butadiene and isoprene are representative of the conjugated diolefin monomer; styrene and $\alpha$-methylstyrene of the aromatic vinyl monomer; methyl acrylate, ethyl acrylate, octyl acrylate, methyl methacrylate, ethyl methacrylate, and octyl methacrylate of the ethylene-like unsaturated carboxylic acid alkyl ester monomer; and acrylonitrile, methacrylonitrile, and ethacrylonitrile of said vinyl cyanide monomer.

According to the present invention, preferred composition of the foregoing graft-polymer is from 25 to 75 weight percent of a conjugated diolefin monomer, from 10 to 50 weight percent of an aromatic vinyl monomer, from 5 to 40 weight percent of an ethylene-like unsaturated carboxylic acid alkyl ester monomer, and, if required, a small quantity (less than 10 percent) of a fourth component copolymerizable with these monomers, a polymerization regulator, a cross-linking agent, and so forth, to make the total monomer quantities 100 weight percent.

The alkyl mercaptan represented by the general formula of R-SH may contain a residual aliphatic alcohol radical having from 2 to 20 carbon atoms, but an alkyl mercaptan containing from 6 to 16 carbon atoms is particularly preferable for the purpose of the present invention. Alkyl mercaptans of this kind have heretofore been generally used as the polymerization regulator for production of MBS resins, and are added either prior to or during the polymerization reaction, most part of which is almost consumed at the time when the reaction is complete. More particularly, even if alkyl mercaptan is added into the polymerization system in a larger quantity than needed to regulate the polymerization degree, it throws various impediments in the reaction such as prolongation of the polymerization time and remarkable lowering of the polymerization degree, and, furthermore, improvement in the weather resistance of the shaped polymer product can hardly be observed. In order to improve the weather resistance property of the vinyl chloride resin, alkyl mercaptan should be added to the polymer latex after an MBS resin has been polymerized, or after a conjugated diolefin has been homo-polymerized or copolymerized. The timing for the addition of such substance, however, is not confined to any particular limit.

Since alkyl mercaptan molecule is coupled with a residual double bond in the conjugated diolefin, the maximum quantity of the alkyl mercaptan to be used may be the same in mole number as the conjugated diolefin component within the MBS resin, but ordinarily, the use of an alkyl mercaptan in a range of from 1/100 to 1/2 mole with respect to the mole number of the conjugated diolefin component will satisfy the object of the present invention and further enhance the economical advantage thereof.

The addition-reaction of alkyl mercaptan is carried out in an emulsion state, wherein alkyl mercaptan, a catalyst, an emulsifier, and water are added into a polymer latex after an MBS resin therewith has been polymerized or after a conjugated diolefin therewithin has been homo-polymerized or copolymerized. In this case, use is made of a free radical forming catalyst such as azo-bis-nitrile compounds, persulfate, organic peroxides, and hydro-peroxides in a quantity of from 0 to 3 percent with respect to alkyl mercaptan added. However, when the catalyst dissolves in neither alkyl mercaptan nor water, but is soluble in organic solvents such as benzene and toluene, the catalyst is first dissolved in the minimum quantity of one of these organic solvents, and then added into the polymer latex.

In order to maintain the mechanical stability of the polymer latex during the reaction to prevent the solid resin from deposition, and also to carry out the reaction uniformly without any hindrance, an emulsifier generally known such as a fatty acid soap, an alkyl sulfonate, and an alkyl aryl sulfonate is used in a quantity of from 0.1 to 2 percent with respect to the MBS resin. Further, an appropriate quantity of water is added to the reaction system to lower the viscosity of the latex and to remove heat generated from reaction, since the resin concentration within the latex and the viscosity thereof tend to increase as the result of the above-described addition reaction. It is also preferred that a suitable quantity of an antioxidation agent is added to the system for the stabilization of the modified MBS resin formed therefrom.

Any of the heretofore-known methods may be employed to blend the modified MBS resin thus produced by addition of alkyl mercaptan according to the above-stated process into a vinyl chloride resin as long as the method is suitable for the intended purpose. For instance, the MBS resin in its emulsion state may be mixed into an aqueous suspension of a vinyl chloride resin, or may be mixed with a vinyl chloride resin in powder form, and then the mixture is dried. It is also possible that powder obtained by acid-deposition and coagulation of the modified MBS resin latex is dry-blended with vinyl chloride resin powder. A suitable equipment such as Henschel mixer and ribbon blender is employed for the powder mixings.

The mixing quantity of the modified MBS resin into a vinyl chloride resin may vary in accordance with its application. In cases where a high impact resistance is required, it is appropriate to blend a quantity of from 10 to 30 weight parts of the modified MBS resin into a quantity of from 90 to 70 weight parts of a vinyl chloride resin. In cases where the general properties of vinyl chloride resin such as impact resistance, heat deformation temperature, tensile strength, and so forth are required to be adequately retained, it is preferred to add a quantity of from 3 to 10 weight parts of the modified MBS resin into a quantity of from 97 to 90 weight parts of vinyl chloride resin. Further, depending on necessity, additives such as heat stabilizer, photostabilizer, antioxidation agent lubricant, plasticizer, filler, and pigment may be added to the resin composition to improve processability and quality thereof.

The vinyl chloride resin compositions produced in accordance with the present invention can be molded by the conventional molding processes employed for the ordinary vinyl chloride resins such as extrusion-molding, compression-molding, injection-molding, blow-molding, and calender processing, any one of which can be chosen in accordance with intended purpose of application.

A vinyl chloride resin used to practice the present invention is a homopolymer of vinyl chloride or copolymers of vinyl chloride monomer in a major quantity and another monomer in a minor quantity copolymerizable therewith such as vinylidene chloride, acrylic ester, methacrylic ester, fatty acid vinyl ester, acrylonitrile, and mono-olefin.

With a view to enabling persons skilled in the art to reduce the present invention into practice, the following preferred examples are presented. It should, however, be noted that the invention is not limited to those examples alone, and any change may be made within the scope of the invention as set forth in the appended claims.

EXAMPLES 1 TO 6

A. Production of MBS Resin 12.5g. of divinyl benzene, 1,000g. of butadiene containing therein 1.25 g. of cumene hydro-peroxide, 250 g. of styrene, 12.5 g. of potassium oleate, 0.0625 g. of disodium salt of ethylene-diamine-tetra-acetic acid, 0.625 g. of formaldehyde sodium sulfoxylate, 0.0375 g. of ferrous sulfate, and 4,000 g. of water containing 1.875 g. of sodium pyrophosphate were charged into an autoclave provided with an agitator, and the batch was subjected to polymerization at 60°C. for 20 hours. To the resulted latex 62.5 g. of a 2 percent aqueous solution of dioctyl sulfosuccinate was further added, after which a 0.5 percent aqueous solution of sulfuric acid was slowly added to the latex to reduce the pH value of the polymer latex from 9.2 to 7.0. Subsequently, a 0.5 percent aqueous solution of sodium hydroxide was added to raise the pH value of the latex to 10.0.

Further, 2.625 g. of divinyl benzene, 350 g. of styrene containing 0.525 g. of cumene hydroperoxide, 175 g. of methyl methacrylate, and 10 g. of water containing 0.173 g. of formaldehyde sodium sulfoxylate were added to this latex, and the batch was again subjected to polymerization at 60°C. for 5 hours.

Still further, 1.125 g. of divinyl benzene, 225 g. of methyl methacrylate containing 0.225 g. of cumene hydroperoxide, and 10 g. of water containing 0.1125 g. of formaldehyde sodium sulfoxylate were added to the latex thus formed, and the mixture was subjected to polymerization at 60°C. for 7 hours. The latex thus formed contained 32.6 percent of solid resin.

B. Production of Modified MBS Resin

The MBS resin latex produced according to the above-described process was subsequently added with an emulsion wherein a required quantity of a mixture of n-dodecyl mercaptan, azo-bis-isobutyro-nitrile, and benzene had been added and emulsified in an aqueous solution of potassium oleate, and the mixture was charged into an autoclave provided with an agitator for reaction at 60°C. for 20 hours.

Table 1 shows receipes for the modified MBS resin, wherein quantity of n-dodecyl mercaptan used was varied, and the rate of coupling (mole percent) of n-dodecyl mercaptan with the butadiene double bonds Table 1

| Examples Component | 1 | 2 | 3 | 4 | 5 | 6 |
|---|---|---|---|---|---|---|
| MBS resin latex | 300 | 300 | 300 | 300 | 300 | 300 |
| n-Dodecyl mercaptan | 9.4 | 18.7 | 37.4 | 93.5 | 149.6 | 187 |
| Azo-bis-isobutyronitrile | 0.094 | 0.187 | 0.37 | 0.94 | 1.5 | 1.87 |
| Benzene | 2.8 | 5.6 | 11 | 28 | 45 | 56 |
| Potassium oleate | 1.1 | 1.2 | 1.5 | 2.2 | 2.9 | 3.4 |
| Water | 16 | 32 | 63 | 159 | 255 | 318 |
| Coupling rate of n-dodecyl mercaptan (mole %) | 5 | 9 | 18 | 42 | 67 | 82 |

Note: The above numerical value of each component is expressed in terms of "part by weight".

available in the MBS resin. The coupling rate of n-dodecyl mercaptan was calculated by quantitatively determining sulfur content in the modified MBS resin thus formed by means of a fluorescent X-ray analysis method.

C. Vinyl Chloride Resin Composition

A vinyl chloride resin composition was prepared by the use of each of the modified MBS resins thus formed in accordance the afore-described process, subject to the following recipe.

| Component | Quantity (wt. parts) |
|---|---|
| Modified MBS resin (according to the present invention) | 10 |
| Vinyl chloride resin (polymerization degree of 1,030) | 90 |
| Tribasic lead sulfate | 2 |
| Dibasic lead stearate | 0.5 |
| Lead stearate | 1 |
| Stearic acid | 0.3 |
| Titanium white | 3 |
| Carbon black | 0.2 |

The above components were thoroughly mixed by a Henschel mixer, and then kneaded at 190°C. for 3 minutes by an 8-inch pilot roll kneader to produce a sheet of the vinyl chloride resin composition. The sheet was then placed in a compression-molding machine, wherein it was preheated at 205°C. for 6 minutes, and the compressed under a load of 150 kg/cm$_2$ for 4 minutes, whereby a plate having a thickness of 6 mm was obtained. Test pieces were cut off from this compression molded plate, and subjected to weathering tests.

The weather resistance of the test pieces was measured by a standard sunshine weather meter "WE-Sun-HC Type" which is a product of Toyo Rikagaku Instruments, Inc. and employs a carbon arc for light irradiation. The test results were indicated in terms of the Izod impact strength (ASTM-D-256-56), when each test piece was irradiated for 100, 200, and 400 hours respectively, as can be seen from Table 2 below.

For comparison, an MBS resin latex produced in accordance with the process set forth in the foregoing (A) was coagulated and then made into powder form, which resin powder was used to form another test piece. The test piece was then subjected to the same test as described above, the results of which are also shown in Table 2.

As is apparent from the test results shown in Table 2, the vinyl chloride resin compositions containing the modified MBS resins produced by addition of n-dodecyl mercaptan according to the present invention have less tendency to lose the impact strength thereof than the comparative example even after irradiation thereonto with ultra-violet ray, and the higher the coupling rate of n-dodecyl mercaptan to the MBS resin is, the less becomes deterioration of the vinyl chloride resin composition due to weathering.

EXAMPLES 7 to 11

Modified MBS resins produced by the same method as described in the above Examples 1 to 6, except for different kinds of alkyl mercaptan used. 10 weight parts of each of the modified MBS resins was blended with 90 weight parts of a vinyl chloride resin (polymerization degree of 1,030) with further addition of several additives in the same preparation as specified in Examples 1 to 6, from which test pieces were formed and subjected to weathering tests, the results of which are shown in Table 3 below. It is recognized from the test results that the weather resistance is improved even with those different kinds of alkyl mercaptan used.

Table 3

| Example | 7 | 8 | 9 | 10 | 11. |
|---|---|---|---|---|---|
| Coupling rate of mercaptan (mole %) | Ethyl mercaptan 5 | n-Octyl mercaptan 6 | n-Decyl mercaptan 7 | t-Dodecyl mercaptan 5 | n-Myristyl mercaptan 8 |
| Irradiation time (hrs.) | | | | | |
| 0 | 130 | 133 | 138 | 131 | 142 |
| 100 | 60 | 68 | 72 | 66 | 76 |
| 200 | 54 | 58 | 60 | 55 | 77 |
| 400 | 47 | 50 | 54 | 47 | 58 |

Note: Izod impact strength was measured by the same method as stated in Examples 1 to 6 above.

EXAMPLE 12

6.25 g. of divinyl benzene, 500 g. of butadiene containing therein 0.625 g. of cumene hydro-peroxide, 125 g. of styrene, 6.25 g. of potassium oleate, 0.0313 g. of disodium salt of ethylenediamine-tetra-acetic acid, 0.313 g. of formaldehyde sodium sulfoxylate, 0.0188 g. of ferrous sulfate, and 2,000 g. of water containing therein 0.938 g. of sodium pyrophosphate were charged into an autoclave provided with an agitator, and the batch was subjected to polymerization at 60°C. for 20 hours. To the resulted polymer latex, 31.3 g. of a 2 percent aqueous solution of dioctyl sulfosuccinate Table 2

| Example | 1 | 2 | 3 | 4 | 5 | 6 | Comparative Example |
|---|---|---|---|---|---|---|---|
| Coupling rate of n-dodecyl mercaptan (mole %) | 5 | 9 | 18 | 42 | 67 | 82 | 0 |
| Irradiation time (hrs.) | | | | | | | |
| 0 | 131 | 146 | 147 | 147 | 148 | 148 | 113 |
| 100 | 66 | 80 | 106 | 125 | 135 | 136 | 20 |
| 200 | 55 | 78 | 93 | 120 | 130 | 133 | 17 |
| 400 | 47 | 76 | 89 | 109 | 120 | 125 | 9 |

Note: The above numerical values denote Izod impact strength (kg-cm/cm$^2$) as measured at 23°C. by the method prescribed in ASTM-D-256-56.

was added. Thereafter, a 0.5 percent aqueous solution of sulfuric acid was added thereto to reduce the pH value of the latex from 9.2 to 7.0. Subsequently, a 0.15 percent aqueous solution of sodium hydroxide was added thereto to raise the pH value of the latex to 10.0.

Further, 320 g. of water containing 12 g. of potassium oleate, 1.87 g. of azo-bis-isonitrile, and 187 g. of n-dodecyl mercaptan containing therein 56 g. of benzene were added to the latex, and the mixture was again subjected to reaction at 60°C. for 20 hours.

Still further, 1.31 g. of divinyl benzene, 175 g. of styrene containing therein 0.262 g. of cumene hydroperoxide, 87 g. of methyl methacrylate, and 5 g. of water containing 0.086 g. of formaldehyde sodium sulfoxylate were added to this latex, and the mixture was subjected to polymerization at 60°C. for 5 hours.

Finally, to the latex, there were added 0.565 g. of divinyl benzene, 113 g. of methyl methacrylate containing therein 0.113 g. of cumene hydro-peroxide, and 5 g. of water containing 0.0565 g. of formaldehyde sodium sulfoxylate, and the mixture was subjected to polymerization at 60°C. for 7 hours.

The polymer latex thus formed was caused to coagulate by addition thereto of hydrochloric acid, and the resulted coagulum was filtered, washed, and dried. The substantial rate of coupling of n-dodecyl mercaptan in this case was 9 mole percent.

10 weight parts of the modified MBS resin thus produced was blended with 90 weight parts of a vinyl chloride resin (polymerization degree of 1,030) with further addition of several additives in the same preparation as specified in Examples 1 – 6, from which test pieces were formed and subjected to weathering tests, the results of which are shown in Table 4 below.

The test results are nearly identical to those of Example 2, from which it is recognized that, even when the graft-polymerization is carried out after n-dodecyl mercaptan has been reacted with a polymerized rubber latex, the weather resistance of the resin composition produced therefrom can be improved.

Table 4

| Irradiation time (hrs.) | Impact strength (kg-cm/cm$^2$) |
| --- | --- |
| 0 | 145 |
| 100 | 78 |
| 200 | 75 |
| 400 | 73 |

Note: Izod impact strength was measured by the same method as specified in Examples 1 to 6.

What we claim is:

1. An impact-resistant vinyl chloride polymer resin composition having improved weather resistance which comprises a blend of (a) from 3 to 30 parts by weight of a modified MBS resin obtained from an addition-reaction of an alkyl mercaptan having 2 to 20 carbon atoms with a butadiene-styrene-methyl methacrylate graftpolymer resin, the amount of alkyl mercaptan being 1/100 to 1 mole per mole of conjugated diolefin in the MBS resin and (b) from 97 to 70 parts by weight of a vinyl chloride homopolymer or copolymer resin wherein said copolymer of vinyl chloride is a copolymer of a major quantity of vinyl chloride and a minor quantity of another monomer selected from the group consisting of vinylidene chloride, acrylic esters, methacrylic esters, fatty acid vinyl esters, acrylonitrile and mono-olefins.

2. The composition as defined in claim 1, in which said alkyl mercaptan is selected from the group consisting of ethyl mercaptan, n-octyl mercaptan, n-decyl mercaptan, t-dodecyl mercaptan, and myristyl mercaptan.

3. The composition as defined in claim 1, in which the amount of alkyl mercaptan is 1/100 to 1/2 mole per mole of the conjugated diolefin in the MBS resin.

* * * * *